US005530768A

United States Patent [19]

Yoshizumi

[11] Patent Number: 5,530,768

[45] Date of Patent: Jun. 25, 1996

[54] SPEECH ENHANCEMENT APPARATUS

[75] Inventor: Yoshiyuki Yoshizumi, Nara, Japan

[73] Assignee: Technology Research Association of Medical and Welfare Apparatus, Tokyo, Japan

[21] Appl. No.: 317,346

[22] Filed: Oct. 4, 1994

[30] Foreign Application Priority Data

Oct. 6, 1993 [JP] Japan .................................... 5-250516

[51] Int. Cl.$^6$ .................................................... H04B 15/00

[52] U.S. Cl. ................................ 381/94; 381/56; 381/46; 381/47

[58] Field of Search ................................ 381/46, 47, 56, 381/94, 110; 395/2.35, 2.36, 2.37, 2.42; 84/621, 627, 663

[56] References Cited

U.S. PATENT DOCUMENTS

| | | | |
|---|---|---|---|
| 4,589,138 | 5/1986 | Milner et al. | 381/110 |
| 4,771,472 | 9/1988 | Williams et al. | 381/94 |
| 5,007,095 | 4/1991 | Nara et al. | 381/51 |

FOREIGN PATENT DOCUMENTS

| | | |
|---|---|---|
| 0076687 | 4/1983 | European Pat. Off. . |
| 0442342 | 8/1991 | European Pat. Off. . |
| 54-139407 | 10/1979 | Japan . |
| 2156299 | 6/1990 | Japan . |
| 4328798 | 11/1992 | Japan . |

OTHER PUBLICATIONS

Search Report for European Appl. 94115784.4, mailed Jul. 2, 1995.

*Primary Examiner*—Curtis Kuntz
*Assistant Examiner*—Minsun Oh
*Attorney, Agent, or Firm*—Renner, Otto, Boisselle & Sklar

[57] ABSTRACT

An apparatus for enhancing speech sounds includes an input circuit for receiving speech sounds and for converting said speech into a speech signal; a rectifier for rectifying the speech signal; a first time constant circuit for applying a first time constant to the output of the rectifier; a second time constant circuit for applying a second time constant to the output of the rectifier; a divider for obtaining the ratio of the output of the first time constant circuit to the output of the second time constant circuit; a multiplier for multiplying the speech signal by the ratio obtained by the divider; and an output circuit for converting the output of the multiplier into speech sounds.

14 Claims, 16 Drawing Sheets

Amplitude
Time

Amplitude
Time

Amplitude
Time

Coefficient
1
0
t1 t2 t3 t4 t5 t6
Time

Amplitude
Time

Amplitude
Time

Amplitude
Time

Amplitude
Time

Coefficient
1
0
Time

Coefficient
1
0
t1 t2 t3 t4 t5 t6
Time

Amplitude
Time

SPEECH ENHANCEMENT APPARATUS

BACKGROUND OF THE INVENTION

1. Field of the Invention

The present invention relates to a speech enhancement apparatus for enhancing rising portions of speech including consonants.

2. Description of the Related Art

FIG. 15 shows a basic configuration of a conventional speech enhancement apparatus. The speech enhancement apparatus includes an amplifier 101 for amplifying a speech signal, a gap detector 102 for detecting a silence component, an envelope follower 103 for following an envelope of the speech signal, a zero crossing detector 104 for determining the zero crossing frequency of the speech signal, and a differentiator 105 for determining the rate of change in the speech signal. The speech enhancement apparatus further includes a one-shot mono/multivibrator 106 which generates a pulse on the basis of the output from the gap detector 102, the differentiator 105, and the zero crossing detector 104 so as to control the amplifier 101.

The operation of such a conventional speech enhancement apparatus will be described with reference to FIGS. 16A to 16C. FIG. 16A shows a waveform of an input speech signal. The input speech signal is sent to the amplifier 101, the gap detector 102, the envelope follower 103, and the zero crossing detector 104. The gap detector 102 detects a silence component of the received speech signal and outputs the result to the one-shot mono/multivibrator 106. The envelope follower 103 follows an envelope of the received speech signal and outputs the result to the differentiator 105. The differentiator 105 determines the rate of change in the envelope and outputs the result to the one-shot mono/multivibrator 106. The zero crossing detector 104 determines the zero crossing frequency of the received speech signal and outputs the result to the one-shot mono/multivibrator 106. Based on the outputs from the gap detector 102, the differentiator 105, and the zero crossing detector 104, the one-shot mono/multi vibrator 106 generates a pulse having a waveform as shown in FIG. 16B. The pulse is generated when a silence component of the speech signal shifts to a sound component thereof and lasts until both the zero crossing frequency and the rate of change in the envelope become sufficiently high. The pulse generated by the one-shot mono/multivibrator 106 is sent to the amplifier 101. On receipt of the pulse, the amplifier 101 amplifies the input speech signal with a predetermined amount of gain, and outputs an amplified speech signal having a waveform as shown in FIG. 16C. When no pulse is sent to the amplifier 101, the original speech signal input to the amplifier 101 is output therefrom with a gain of 1 (one), i.e., without any amplification.

Such a conventional speech enhancement apparatus amplifies only a specific consonant of the speech signal with the predetermined amount of gain, since the gain of the amplifier 101 is controlled based on a pulse output of the one-shot mono/multivibrator 106. The gain of the amplifier 101 drastically changes when the pulse output of the one-shot mono/multivibrator 106 is switched. This causes distortion. Further, the conventional speech enhancement apparatus amplifies consonants having different levels from each other with the same gain, since the gain of the amplifier 101 is predetermined. As a result, it is impossible to amplify various kinds of consonants roan appropriate level.

SUMMARY OF THE INVENTION

The apparatus for enhancing speech of this invention, includes: an input circuit for receiving a speech and for converting the speech into a speech signal; a rectifier coupled to the input circuit for rectifying the speech signal; a first time constant circuit coupled to the rectifier for applying a first time constant to the output of the rectifier; a second time constant circuit coupled to the rectifier for applying a second time constant to the output of the rectifier, the second time constant being different from the first time constant; a divider coupled to the first time constant circuit and the second time constant circuit for obtaining a ratio of the output of the first time constant circuit to the output of the second time constant circuit; a multiplier coupled to the input circuit and the divider for multiplying the speech signal by the ratio obtained by the divider; and an output circuit coupled to the multiplier for converting the output of the multiplier into speech.

In one embodiment of the invention, the first time constant is smaller than the second time constant.

In another embodiment of the invention, the divider outputs a signal of 1 (one) to the multiplier when the output of the second time constant circuit is zero.

In another embodiment of the invention, the apparatus further includes: a third time constant circuit coupled to the divider for applying a third time constant to the output of the divider, wherein the multiplier multiplies the speech signal by the output of the third time constant circuit.

In another embodiment of the invention, the apparatus further includes: a limiter coupled to the divider for limiting the output of the divider within a predetermined range defined by at least one of a lower limit and an upper limit, and wherein the multiplier multiplies the speech signal by the output of the limiter.

In another embodiment of the invention, the lower limit of the limiter is 1 (one).

In another embodiment of the invention, a third time constant circuit coupled to the divider for applying a third time constant to the output of the divider, and a limiter coupled to the third time constant circuit for limiting the output of the third time constant circuit within a predetermined range defined by at least one of a lower limit and an upper limit, and wherein the multiplier multiplies the speech signal by the output of the limiter.

In another embodiment of the invention, the lower limit of the limiter is 1 (one).

In another aspect of this invention, an apparatus for enhancing speech includes: an input circuit for receiving speech and for converting the speech into a speech signal; a rectifier coupled to the input circuit for rectifying the speech signal; a first time constant circuit coupled to the rectifier for applying a first time constant to the output of the rectifier; a second time constant circuit coupled to the rectifier for applying a second time constant to the output of the rectifier, the second time constant being different from the first time constant; a divider coupled to the first time constant circuit and the second time constant circuit for obtaining the ratio of the output of the first time constant circuit to the output of the second time constant circuit; a level detector coupled to the input circuit for detecting an instantaneous level of the speech signal; an average level detector coupled to the input circuit for detecting an average level obtained by averaging the speech signal for a predetermined time period; a comparator coupled to the level detector and the average level detector for obtaining the difference between the instantaneous level detected by the level detector and the average level detected by the average level detector, and for outputting a coefficient signal based on a comparison result of the difference and a predetermined. threshold value; a third time constant circuit coupled to the comparator for applying a third time constant to the coefficient signal output from the comparator; a control circuit coupled to the divider and the third time constant circuit for selectively outputting one of the output of the divider and the output of the third time constant circuit based on the output of the third time constant circuit; a multiplier coupled to the input circuit and the control circuit for multiplying the speech signal by the output of the control circuit; and an output circuit coupled to the multiplier for converting the output of the multiplier into a speech.

In one embodiment of the invention, the first time constant is smaller than the second time constant.

In another embodiment of the invention, the divider outputs a signal of 1 (one) to the multiplier when the output of the second time constant circuit is zero.

In another aspect of this invention, an apparatus for enhancing speech includes: an input circuit for receiving speech and for converting the speech into a speech signal; a rectifier coupled to the input circuit for rectifying the speech signal; a first time constant circuit coupled to the rectifier for applying a first time constant to the output of the rectifier; a second time constant circuit coupled to the rectifier for applying a second time constant to the output of the rectifier, the second time constant being different from the first time constant; a divider coupled to the first time constant circuit and the second time constant circuit for obtaining a ratio of the output of the first time constant circuit to the output of the second time constant circuit; a third time constant circuit coupled to the rectifier for applying a third time constant to the output of the rectifier; a fourth time constant circuit coupled to the rectifier for applying a fourth time constant to the output of the rectifier, the fourth time constant being different from the third time constant; a comparator coupled to the third time constant circuit and the fourth time constant circuit for obtaining the difference between the output of the third time constant circuit and the output of the fourth time constant circuit, and for outputting a coefficient signal based on the result of the comparison of the difference and a predetermined threshold value; a fifth time constant circuit coupled to the comparator for applying a fifth time constant to the coefficient signal output from the comparator; a control circuit coupled to the divider and the fifth time constant circuit for selectively outputting one of the output of the divider and the output of the fifth time constant circuit based on the output of the fifth time constant circuit; a multiplier coupled to the input circuit and the control circuit for multiplying the speech signal by the output of the control circuit; and an output circuit coupled to the multiplier for converting the output of the multiplier circuit into speech.

In one embodiment of the invention, the first time constant is smaller than the second time constant.

In another embodiment of the invention, the divider outputs a signal of 1 (one) to the multiplier when the output of the second time constant circuit is zero.

According to the speech enhancement apparatus of the present invention, the difference between speech levels in the rising portion of the speech can be obtained by the use of different time constants. The speech sounds are enhanced based on the change of speech levels by amplifying the input speech by the use of the ratio of this difference. As a result, the rising portion of the speech including consonants is enhanced. Since the time constants change continuously, clear and natural speech can be output without distortion, even if the degree of amplification of the speech is drastically changed.

Thus, the invention described herein makes possible the advantage of providing a speech enhancement apparatus capable of controlling the gain smoothly with a simple process by determining a degree of amplification of the speech based on the change of the speech level.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

EXAMPLE 1

Figure 1:
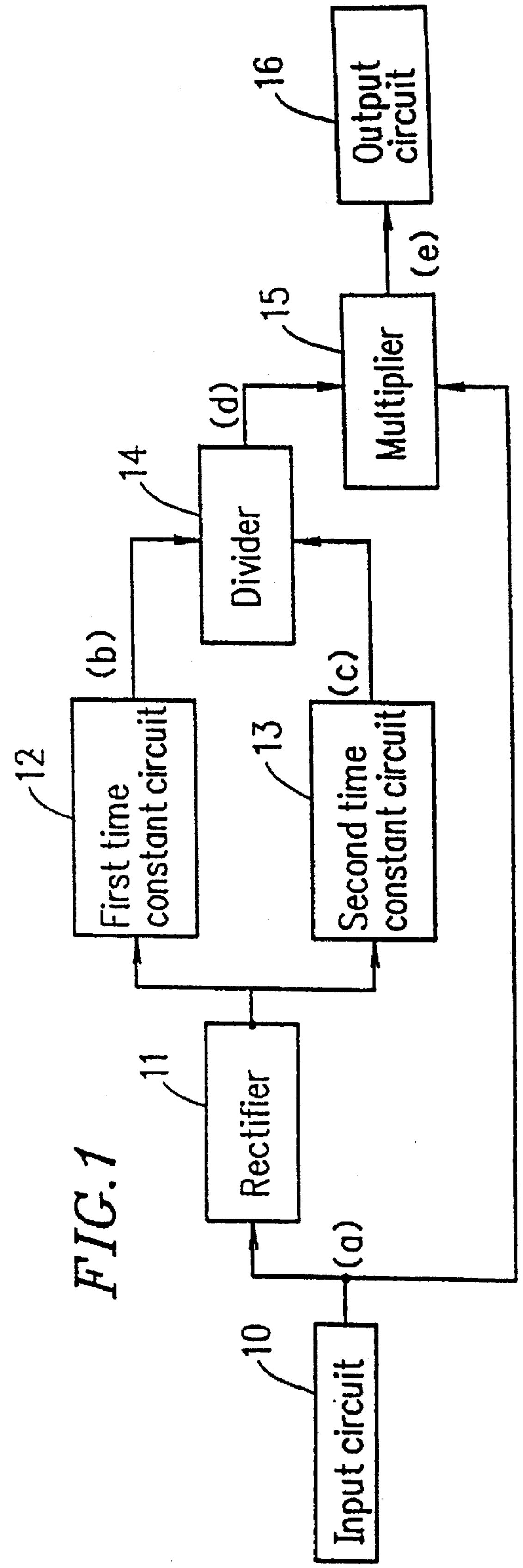
FIG. 1 is a block diagram of a first example of the speech enhancement apparatus according to the present invention.

FIG. 1 shows the configuration of a first example of the speech enhancement apparatus according to the present invention. The speech enhancement apparatus includes an input circuit 10, a rectifier 11, a first time constant circuit 12, a second time constant circuit 13, a divider 14, a multiplier 15 and an output circuit 16.

The input circuit 10 receives a speech and then converts the received speech into an electric signal. In this specification, this electric signal is referred to as a "speech signal". The rectifier 11 rectifies the output of the input circuit 10. The first time constant circuit 12 applies a first time constant to the output of the rectifier 11. The second time constant circuit 13 applies a second time constant which is different from the first time constant to the output of the rectifier 11. The first and second time constants each is a parameter which determines the length of time in which a signal is changed from a predetermined level to another predetermined level. The divider 14 divides the output of the first time constant circuit 12 by the output of the second time constant circuit 13 so as to calculate the ratio of the output of the first time constant circuit 12 to the output of the second fine constant circuit 13. The multiplier 15 multiplies the output of the input circuit 10 by the output of the divider 14 so as to amplify the output of the input circuit 10 with the ratio calculated by the divider 14. The output circuit 16 converts the output of the multiplier 15 into speech.

Next, referring to FIGS. 2A to 2E, the operation of the speech enhancement apparatus of this example will be described.

Figures 2A, 2B, 2C, 2D, 2E:
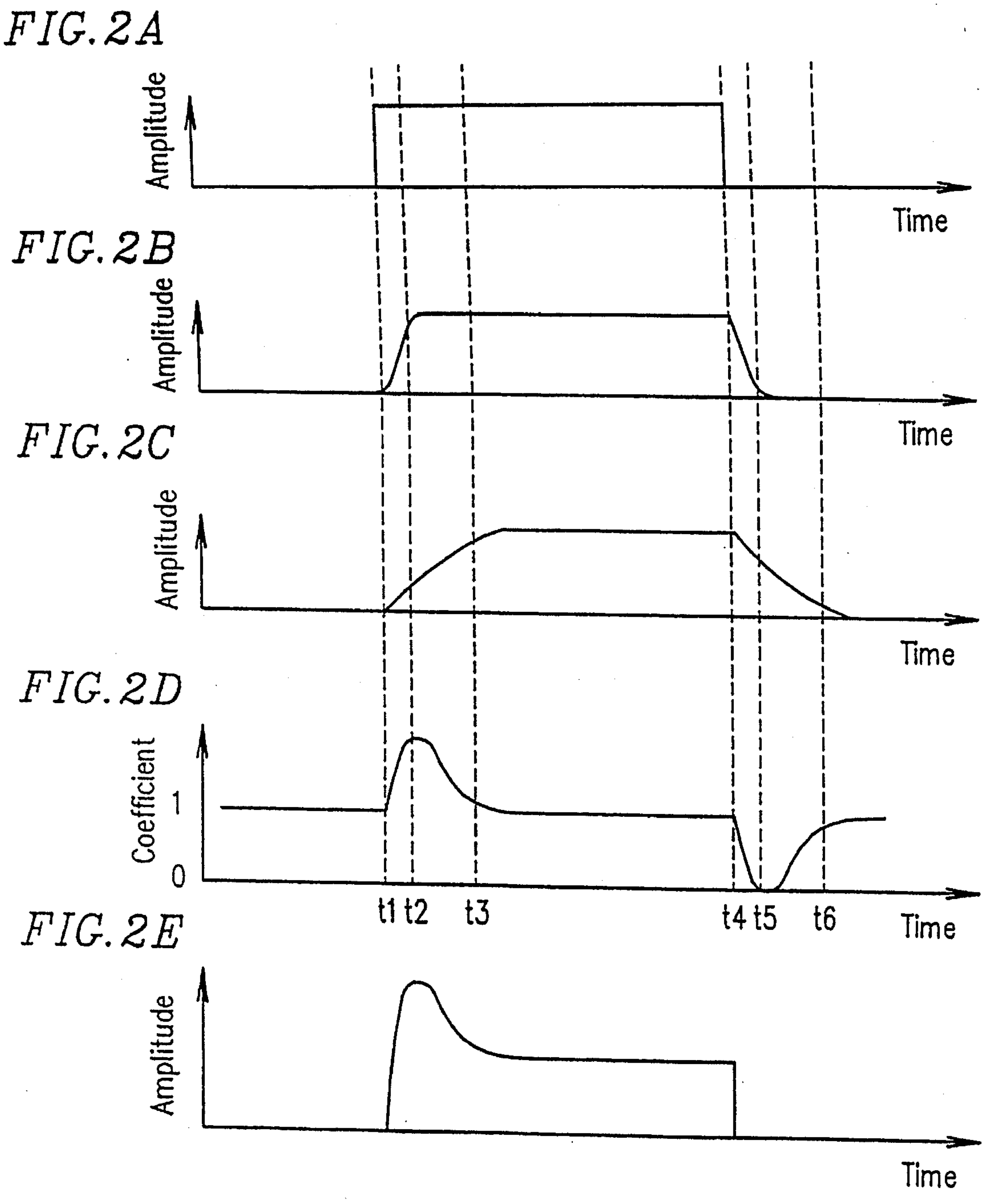
FIG. 2 is diagrams showing waveforms of a speech signal at different stages in the process by the first example of the speech enhancement apparatus according to the present invention.

FIGS. 2A to 2E show waveforms of the speech signal at points (a) to (e) shown in FIG. 1. For simplicity of the explanation, it is assumed that the speech signal at point (a) has a rectangular-shaped waveform having a rising edge and a falling edge, as is shown in FIG. 2A. This is because the present invention is characterized by the enhancement of the rising portion of the speech signal. However, the present invention can be applied to a speech signal having arbitrary waveform.

The input circuit 10 receives speech, and converts the received speech into a speech signal. The speech signal is supplied to the rectifier 11. The rectifier 11 performs a full-wave rectification of the speech signal so as to output the resultant speech signal to the first and second time constant circuits 12 and 13.

The first time constant circuit 12 applies a first time constant to the output of the rectifier 11. The first time constant includes an attack time $T_{a1}$ corresponding to the rising portion of the speech signal and a release time $T_{r1}$ corresponding to the falling portion of the speech signal. The attack time $T_{a1}$ is a time period ($t_2$–$t_1$) shown in FIG. 2B, and the release time $T_{r1}$ is a time period ($t_5$–$t_4$) shown in FIG. 2B.

The second time constant circuit 13 applies a second time constant to the output of the rectifier 11. The second time constant includes an attack time $T_{a2}$ corresponding to the rising portion of the speech signal and a release time $T_{r2}$ corresponding to the falling portion of the speech signal as time constants. The attack time $T_{a2}$ is a time period ($t_3$–$t_1$) shown in FIG. 2C, and the release time $T_{r2}$ is a time period ($t_6$–$t_4$) shown in FIG. 2C.

These time constants satisfy the relationship of $T_{a1} \leqq T_{a2}$ and $T_{r1} \leqq T_{r2}$. In addition, it is preferably that the attack time $T_{a1}$ is smaller than 30 msec. This is because there exists a feature information of a consonant within 30 msec from the rising time $t_1$. It is preferable that the attack time $T_{a2}$ is smaller than 50 msec. This is because, when the attack time $T_{a2}$ is more than 50 msec, the influence of a vowel on the enhancement of the speech becomes too large, which prevents an appropriate enhancement of a consonant.

FIG. 2B shows the waveform of the output of the first time constant circuit 12, and FIG. 2C shows the waveform of the output of the second time constant circuit 13. Since the above-mentioned relationship is satisfied in time constants, the slope of the rising portion of the speech signal in FIG. 2C is smaller than the slope of the rising portion of the speech signal in FIG. 2B, and the slope of the falling portion of the speech signal in FIG. 2C is smaller than the slope of the falling portion of the speech signal in FIG. 2B.

If the output of the second time constant circuit 13 is not zero, the divider 14 calculates the ratio of the output of the first time constant circuit 12 to the output of the second time constant circuit 13, and outputs the calculated ratio to the multiplier 15. If the output of the second time constant circuit 13 is zero, the divider 14 outputs a constant coefficient of 1 (one) to the multiplier 15.

FIG. 2D shows the waveform of the output of the divider 14. As is shown in FIG. 2D, the output of the divider 14 (referred to as a "coefficient") is equal to 1 (one) at first, then gradually increases up to a peak level and comes back to 1 (one) after the peak level in response to the rising portion of the speech signal. The coefficient gradually decreases and comes back to 1 (one) in response to the falling portion of the speech signal.

The multiplier 15 multiplies the speech signal shown in FIG. 2A by the coefficient shown in FIG. 2D. As a result, a speech signal having an enhanced rising portion is obtained as the output of the multiplier 15, as is shown in FIG. 2E. The output of the multiplier 15 is supplied to the output circuit 16. The output circuit 16 converts the output of the multiplier 15 into speech. Thus, speech having an enhanced rising portion of the input speech is output from the output circuit 16.

Figure 3A:
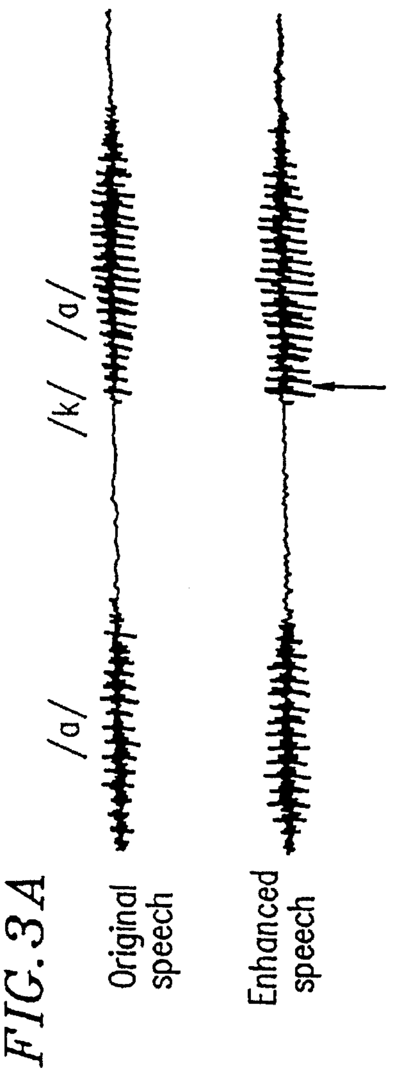
FIG. 3A is a diagram showing waveforms of original speech sounds and enhanced speech sounds.

FIG. 3A shows the waveform of an original speech which is input to the speech enhancement apparatus and the waveform of an enhanced speech which is output from the speech enhancement apparatus. The enhanced rising portion of the speech is indicated by an arrow. In this specification, "rising portion of the speech" is defined as a portion in which the level (or energy) of the speech is rising. The enhancement of the rising portion of the speech is very useful to improve the intelligibility of consonants, especially plosives such as /p/,/t/,/k/,/b/,/d/ and /g/.

Figure 3B:
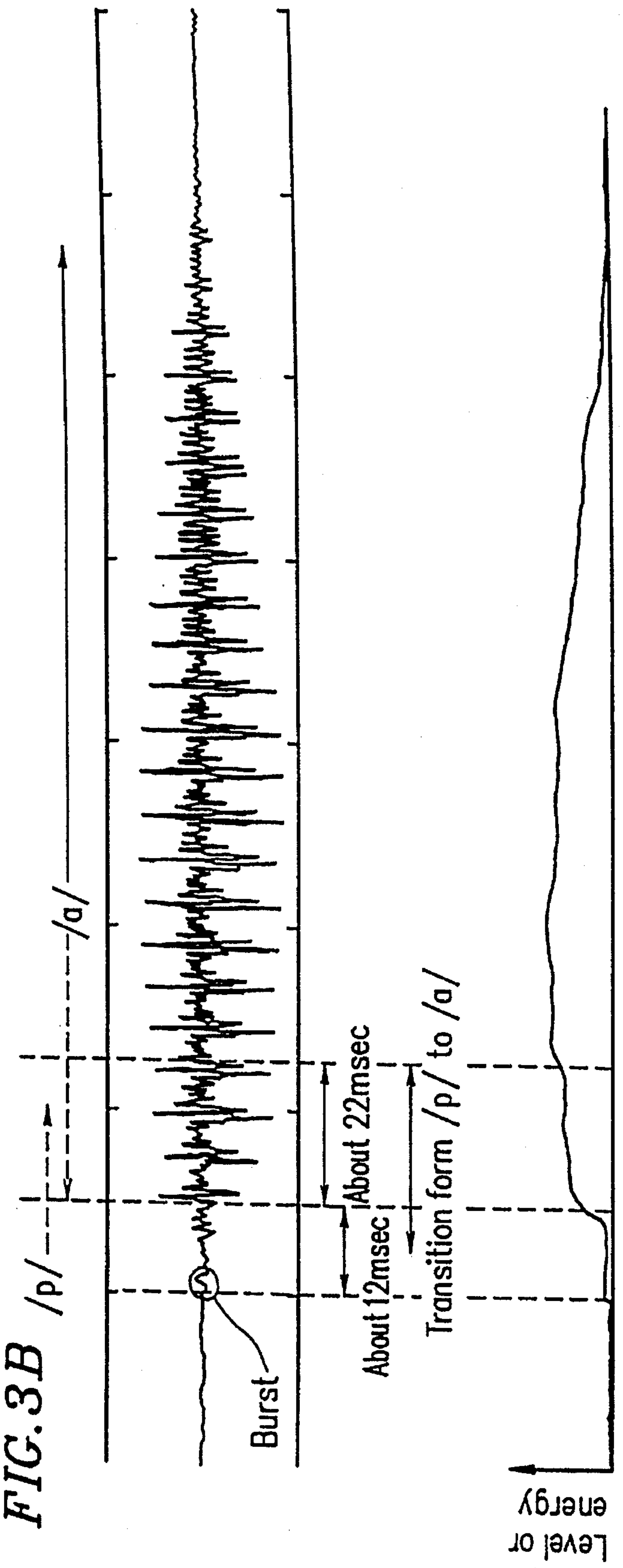
FIG. 3B is a diagram showing the actual relationship between the waveform of the speech and the level (or energy) of the speech.

FIG. 3B shows the actual relationship between the waveform of the speech and the level (or energy) of the speech.

Thus, according to the speech enhancement apparatus having the configuration mentioned above, the rising portion of the speech is enhanced based on the difference between the time constants. Since the time constants change continuously, the degree of amplification of the speech is not drastically changed. As a result, clear and natural speech can be obtained without distortion.

EXAMPLE 2

Figure 4:
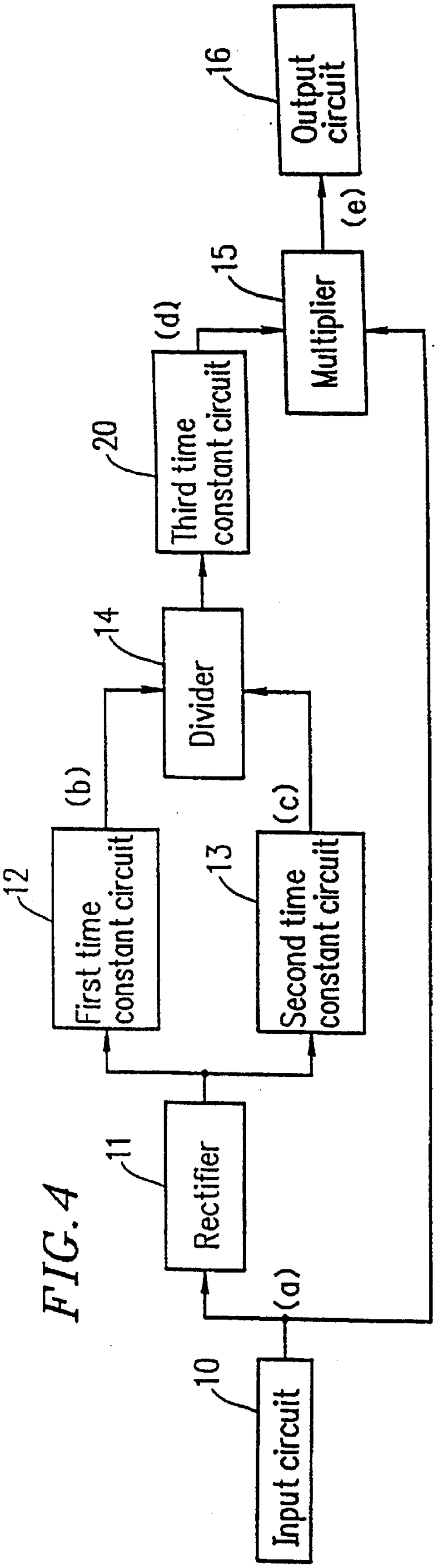
FIG. 4 is a block diagram of a second example of the speech enhancement apparatus according to the present invention.

FIG. 4 shows the configuration of a second example of the speech enhancement apparatus according to the present invention. The second example is different from the first example in that a third time constant circuit 20 is inserted between the divider 14 and the multiplier 15. The output of the divider 14 is coupled to the third time constant circuit 20. The output of the third time constant circuit 20 is coupled to the multiplier 15. In FIG. 4, the same components as the first example have the same reference numerals, and the explanation thereof will be omitted.

The third time constant circuit 20 applies a third time constant to the output of the divider 14. The third time constant includes an attack time $T_{a3}$ corresponding to a rising portion of the speech signal and a release time $T_{r3}$ corresponding to a falling portion of the speech signal. The attack time $T_{a3}$ and the release time $T_{r3}$ satisfy the relationship of $T_{a3} \leqq T_{r3}$. The attack time $T_{a3}$ may be 0 msec.

Figures 5A, 5B, 5C, 5D, 5E:
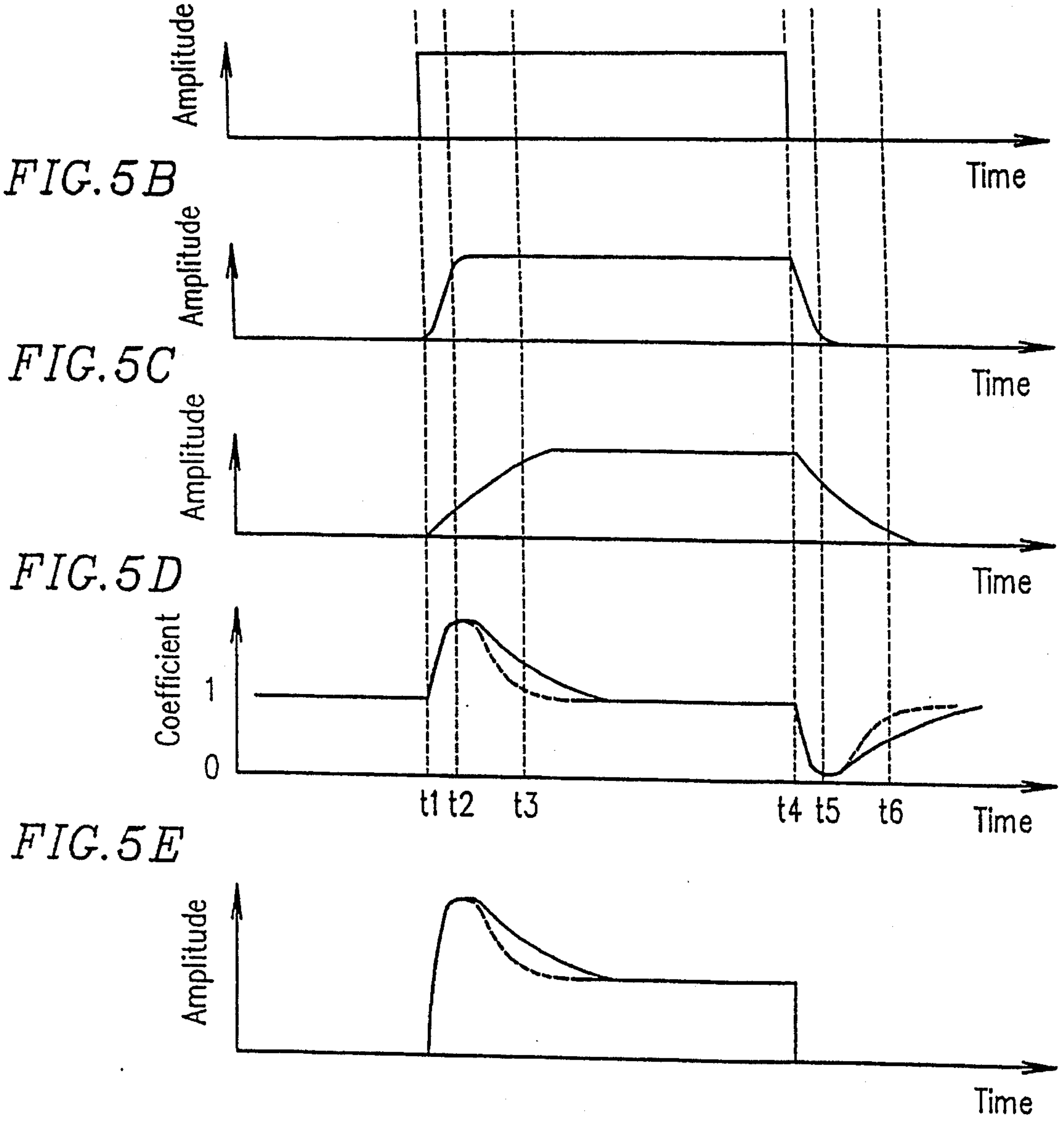
FIG. 5 is diagrams showing waveforms of a speech signal at different stages in the process by the second example of the speech enhancement apparatus according to the present invention.

FIGS. 5A to 5E show waveforms of the speech signal at points (a) to (e) shown in FIG. 4. In FIG. 5D, the solid line indicates the output of the third time constant circuit 20, and the broken line indicates the output of the divider 14.

Thus, according to the speech enhancement apparatus having the configuration mentioned above, the rising portion of the speech is enhanced based on the difference between the time constants. In addition, the duration of the enhancement can be controlled depending on the third time constant. Since, in man cases, the rising portion of the speech includes a consonant and a vowel, it is possible to enhance the transition from the consonant to the vowel. As a result, clear and natural speech can be obtained.

EXAMPLE 3

Figure 6:
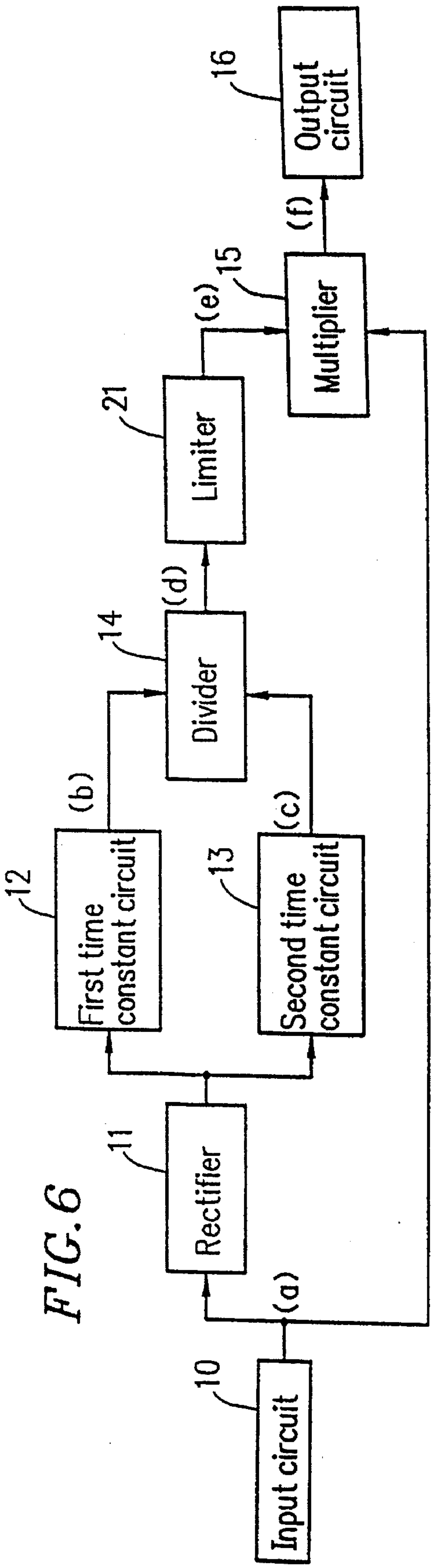
FIG. 6 is a block diagram of a third example of the speech enhancement apparatus according to the present invention.

FIG. 6 shows the configuration of a third example of the speech enhancement apparatus according to the present invention. The third example is different from the first example in that a limiter 21 is inserted between the divider 14 and the multiplier 15. The output of the divider 14 is coupled to the limiter 21. The output of the limiter 21 is coupled to the multiplier 15. In FIG. 6, the same components as the first example has the same reference numerals, and the explanation thereof will be omitted.

The limiter 21 limits the output of the divider 14 within the range from a lower limit to an upper limit. For example, the upper limit is 5 and the lower limit is 1 (one).

Figures 7A, 7B, 7C, 7D, 7E, 7F:
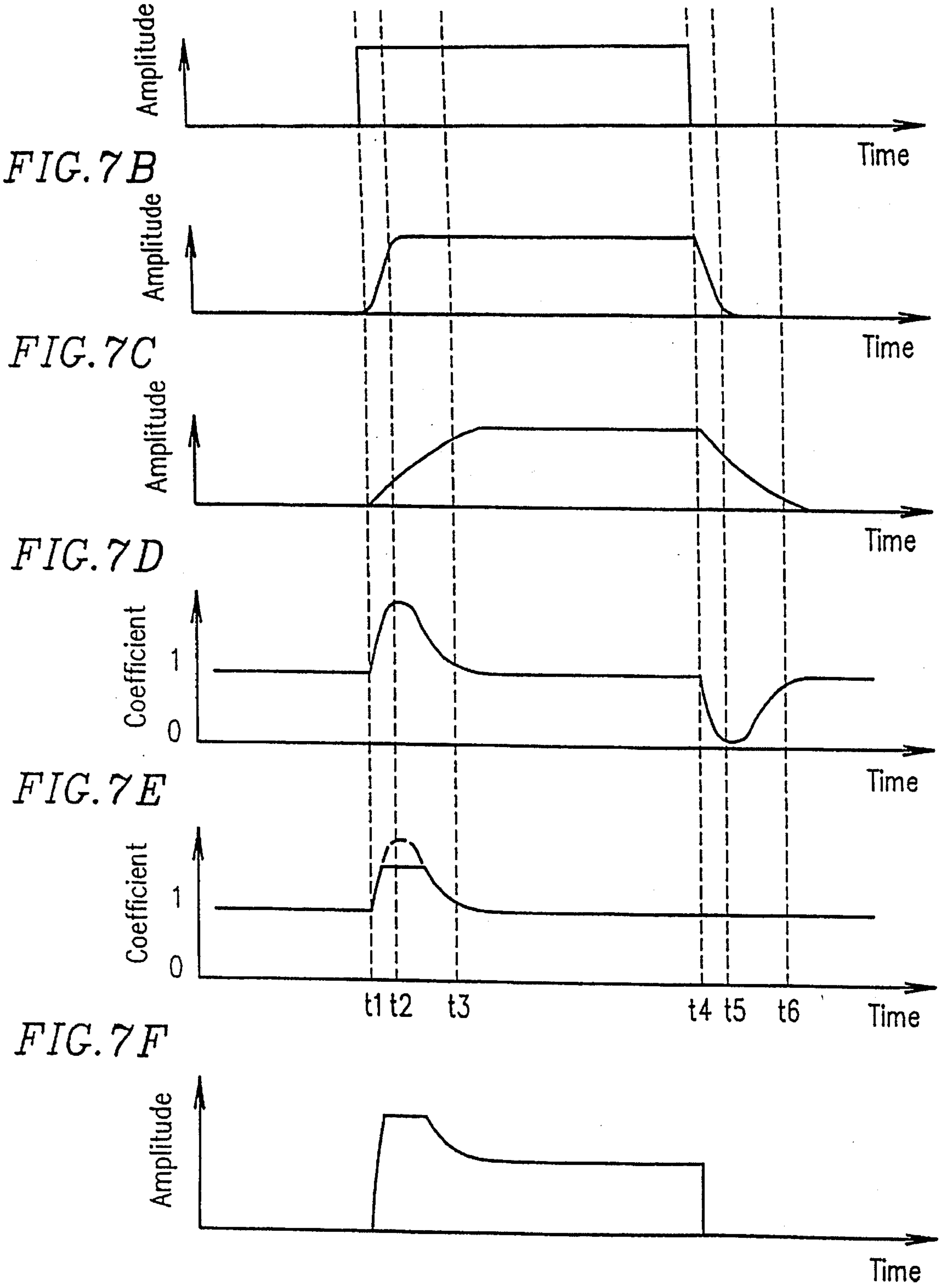
FIG. 7 is diagrams showing waveforms of a speech signal at different stages in the process by the third example of the speech enhancement apparatus according to the present invention.
Figure 8A:
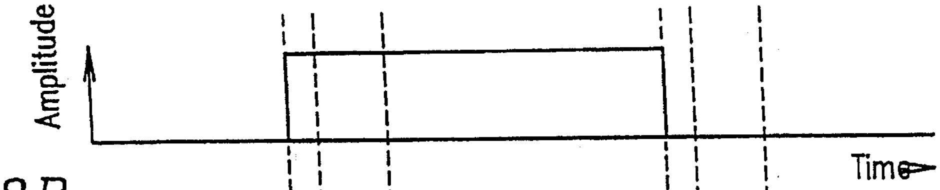
FIG. 8 is diagrams showing waveforms of a speech signal at different stages in the process by the third example of the speech enhancement apparatus according to the present invention.
Figure 8B:
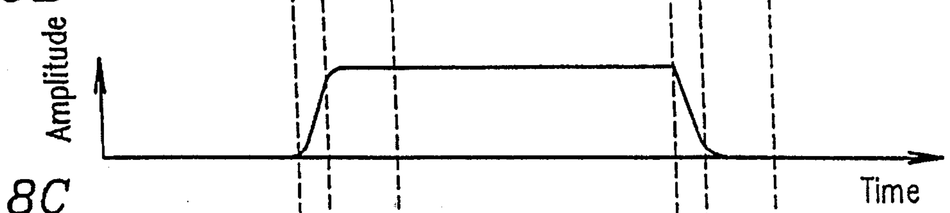
Figure 8C:
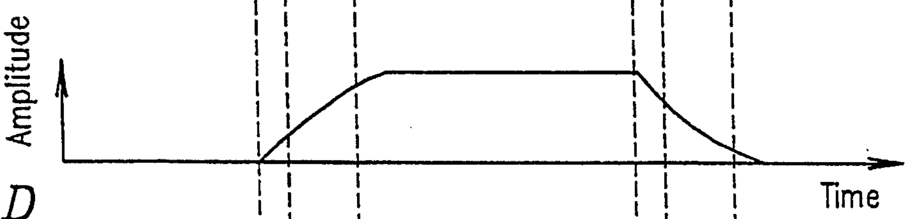
Figure 8D:
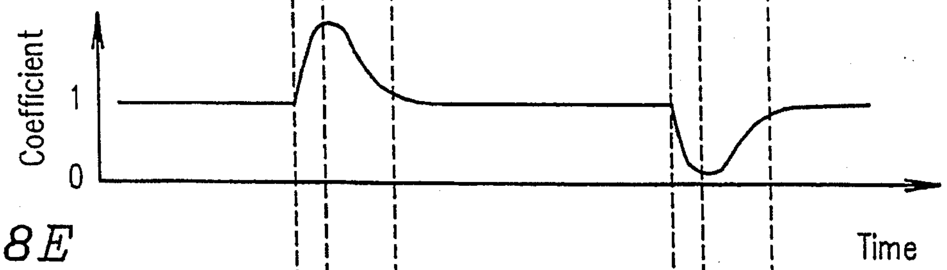
Figure 8E:
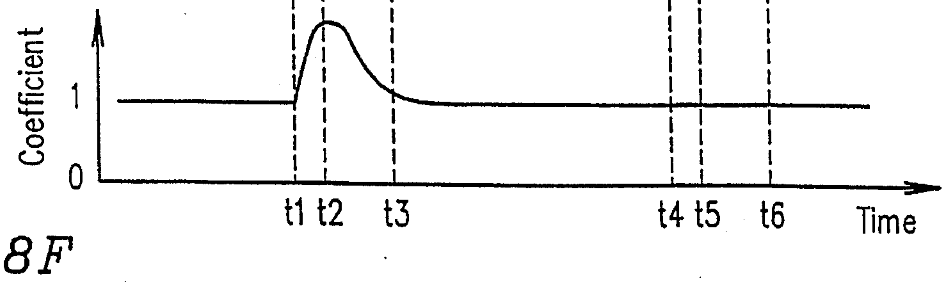
Figure 8F:
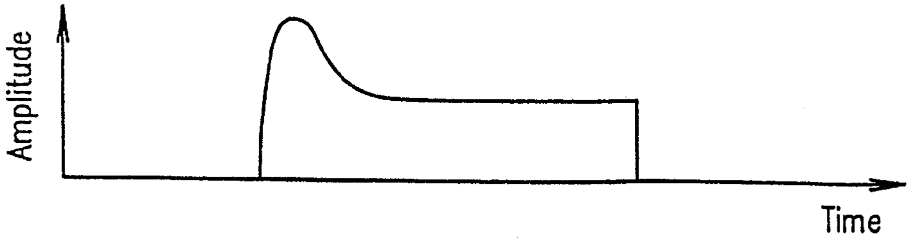

FIGS. 7A to 7F show waveforms of the speech signal at points (a) to (f) shown in FIG. 6. In FIG. 7E, the solid line indicates the output of the limiter 21, and the broken line indicates the output of the divider 14.

Thus, according to the speech enhancement apparatus having the configuration mentioned above, the rising portion of the speech is enhanced based on the difference between the time constants. In addition, the excessive amplification of the rising portion of the speech can be avoided by the use of the upper limit of the limiter 21, and the attenuation of the speech can be avoided by the use of the lower limit of the limiter 21. Since, in many cases, the rising portion of the speech includes a consonant and a vowel, it is possible to avoid a different sound from the original which is caused by the excessive amplification of the consonant and to avoid the distortion which is caused by the attenuation of the vowel. As a result, clear and natural speech can be obtained, Alternatively, the limiter 21 may only set the lower limit without setting the upper limit. For example, the lower limit is 1 (one). In this case, the attenuation of the speech can be avoided by the use of the lower limit of the limiter 21.

FIGS. 8A to 8F show waveforms of the speech signal at points (a) to (f) shown in FIG. 6 in the case where the limiter 21 only sets the lower limit without setting the upper limit.

EXAMPLE 4

Figure 9:
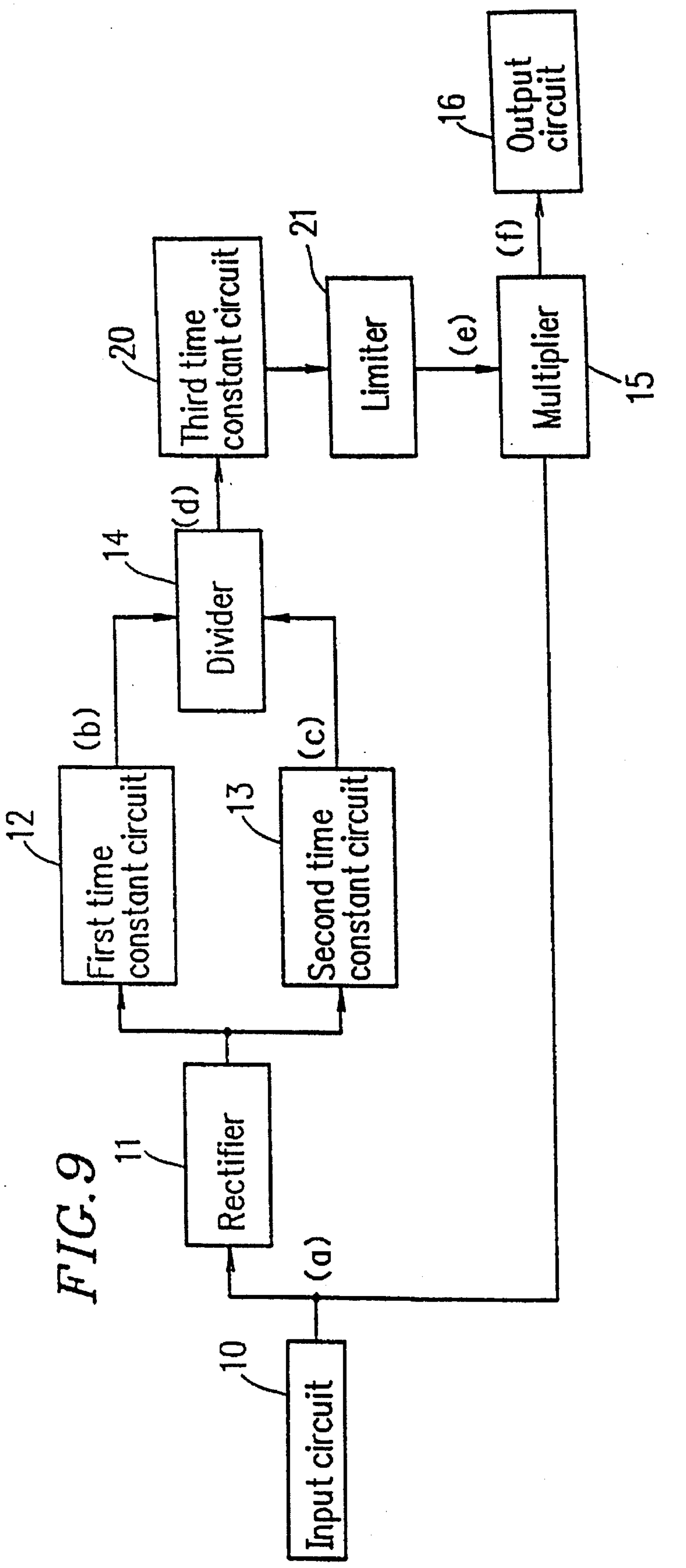
FIG. 9 is a block diagram of a fourth example of the speech enhancement apparatus according the present invention.

FIG. 9 shows the configuration of a fourth example of the speech enhancement apparatus according to the present invention. The fourth example is different from the first example in that a third time constant circuit 20 and a limiter 21 are inserted between the divider 14 and the multiplier 15. Specifically, the fourth example is a combination of the second example with the third example. In FIG. 9, the same components as the first example have the same reference numerals, and the explanation thereof will be omitted.

The third time constant circuit 20 applies a third time constant to the output of the divider 14. The third time constant includes an attack time $T_{a3}$ corresponding to a rising portion of the speech signal and a release time $T_{r3}$ corresponding to a falling portion of the speech signal. The attack time $T_{a3}$ and the release time $T_{r3}$ satisfy the relationship of $T_{a3} \leqq T_{r3}$. The attack time $T_{a3}$ may be 0 msec.

The limiter 21 limits the output of the third time constant circuit 20 within the range from a lower limit to an upper limit. For example, the upper limit is 5 and the lower limit is 1 (one).

Figures 10A, 10B, 10C, 10D, 10E, 10F:
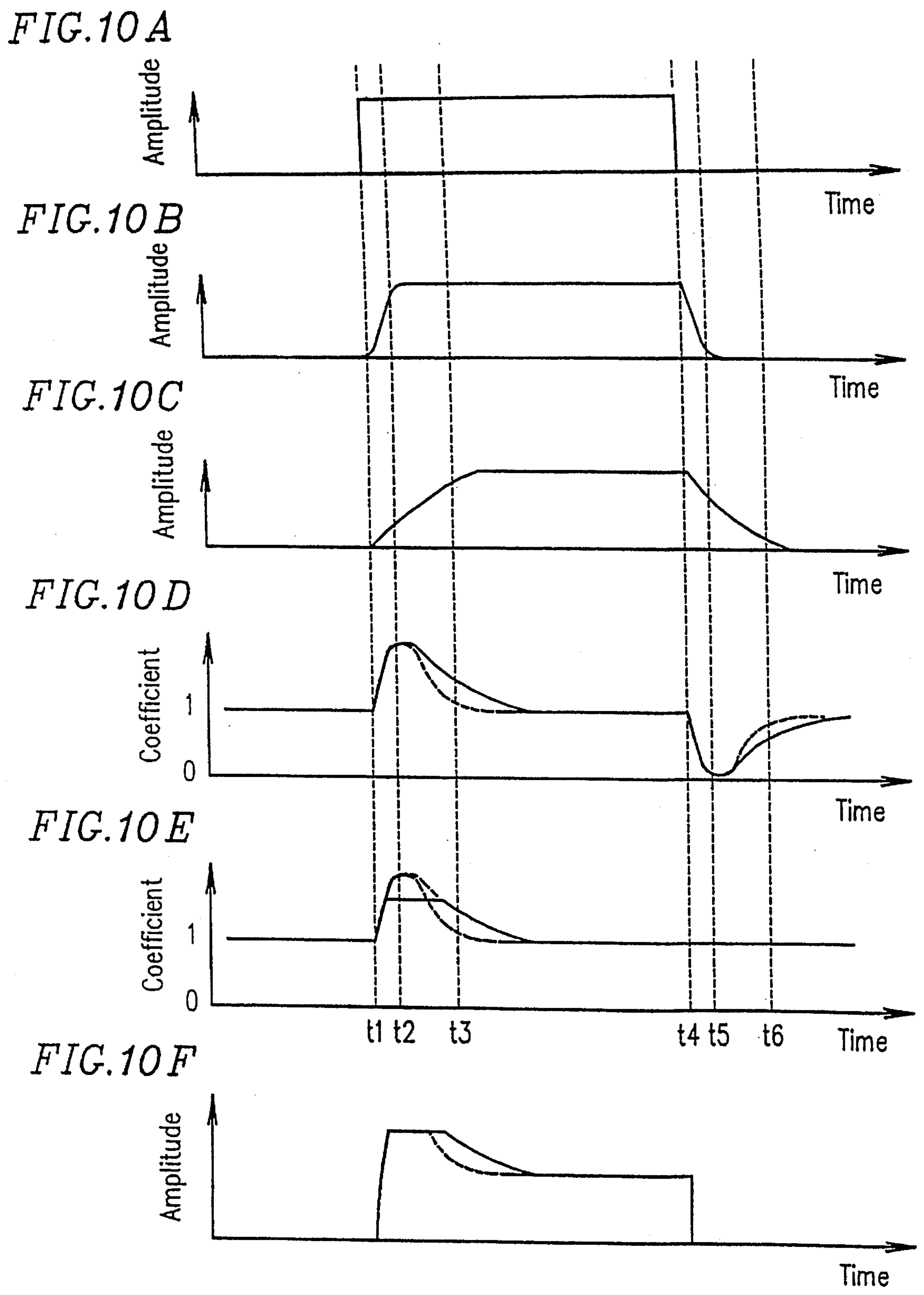
FIG. 10 is diagrams showing waveforms of a speech signal at different stages in the process by the fourth example of the speech enhancement apparatus according to the present invention.

FIGS. 10A to 10F show waveforms of the speech signal at points (a) to (f) shown in FIG. 9. In FIG. 10D, a solid line indicates the output of the third time constant circuit 20, and a broken line indicates the output of the divider 14. In FIG. 10E, a solid line indicates the output of the limiter 21, and a broken line indicates the output of the third time constant circuit 20.

Thus, according to the speech enhancement apparatus having the configuration mentioned above, the rising portion of the speech is enhanced based on the difference between the time constants. In addition, the duration of the enhancement can be controlled depending on the third time constant. The excessive amplification of the rising portion of the speech can be avoided by the use of the upper limit of the limiter 21, and the attenuation of the speech can be avoided by the use of the lower limit of the limiter 21. Since, in many cases, the rising portion of the speech includes a consonant and a vowel, it is possible to enhance the transition from the consonant to the vowel. It is also possible to avoid a different sound from the original which is caused by the excessive amplification of the consonant and to avoid the distortion which is caused by the attenuation of the vowel. As a result, a clear and natural speech can be obtained.

EXAMPLE 5

Figure 11:
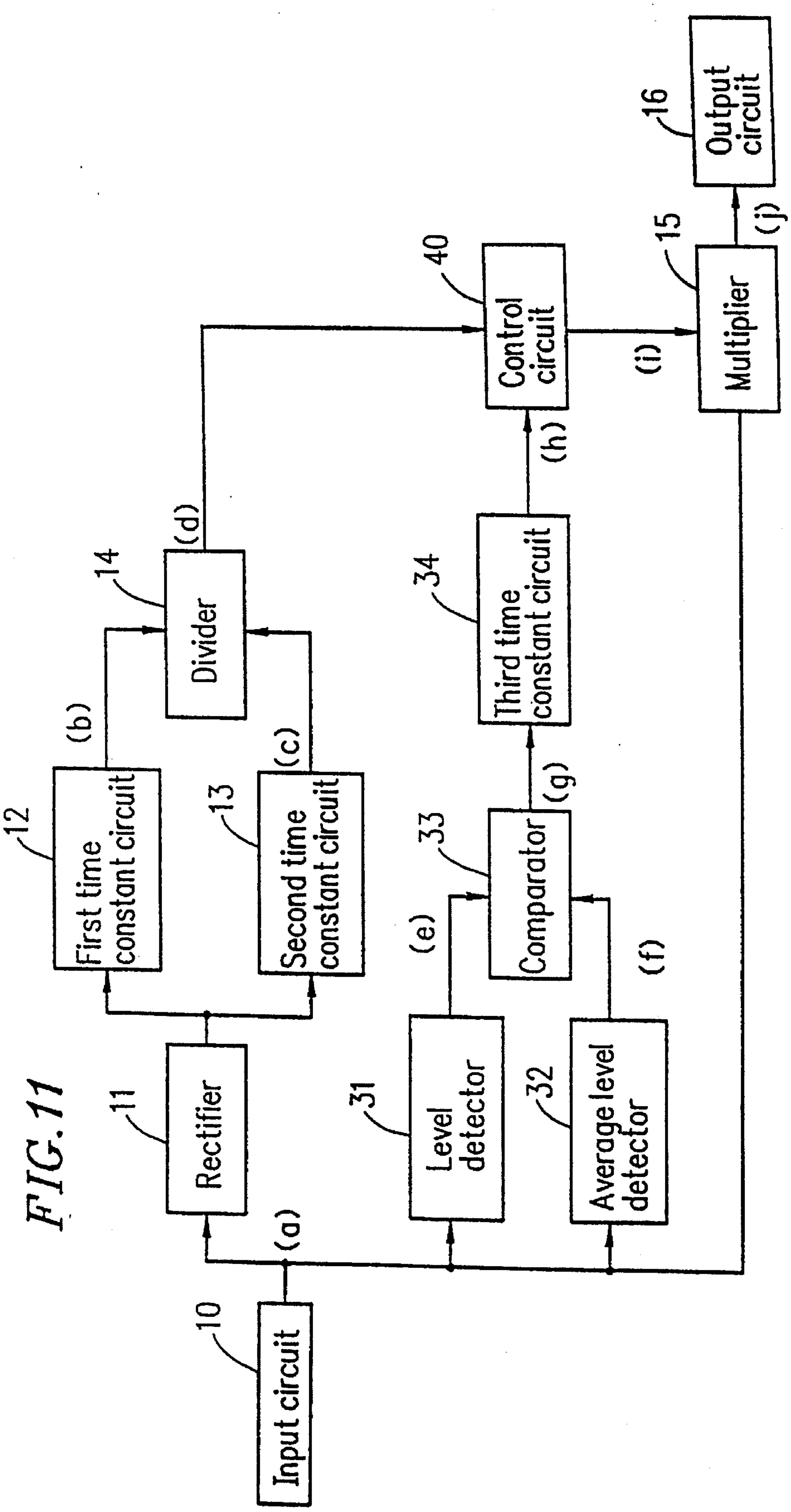
FIG. 11 is a block diagram of a fifth example of the speech enhancement apparatus according to the present invention.

FIG. 11 shows the configuration of a fifth example of the speech enhancement apparatus according to the-present invention. The fifth example is different from the first example in that a circuit for restraining an impulsive sound is added. The circuit includes a level detector 31 for detecting an instantaneous level of the output of the input circuit 10, an average level detector 32 for detecting an average level obtained by averaging the output of the input circuit 10 for a predetermined time period, a comparator 33 for comparing the difference between the output of the level detector 31 and the output of the average level detector 32 with a predetermined threshold value so as to output the comparison result, a third time constant circuit 34 for applying a third time constant to the output of the comparator 33, and a control circuit 40 for controlling the selection of one of the output of divider 14 and the output of the third time constant circuit 34 depending on the output of the third time constant circuit 34. In FIG. 11, the same components as the first example has the same reference numerals, and the explanation thereof will be omitted.

Next, referring to FIGS. 12A to 12J, the operation of the speech enhancement apparatus of this example will be described.

Figures 12A, 12B, 12C, 12D, 12E, 12F, 12G, 12H, 12I, 12J:
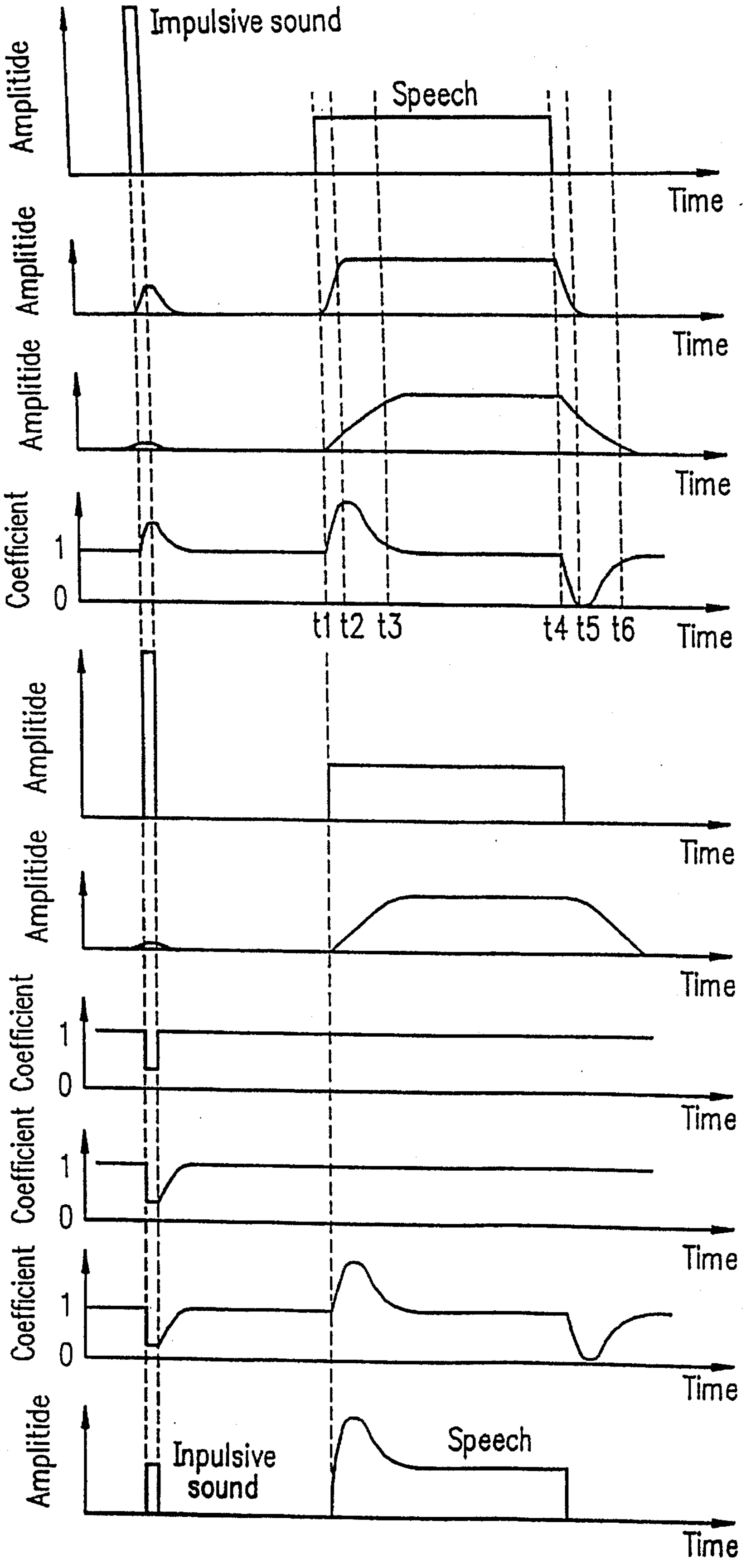
FIG. 12 is diagrams showing waveforms of a speech signal at different stages in the process by the fifth example of the speech enhancement apparatus according to the present invention.

FIGS. 12A to 12J show waveforms of the speech signal at points (a) to (3) shown in FIG. 11. For simplicity of the explanation, it is assumed that the impulsive sound and the speech signal at point (a) have a rectangular-shaped waveform having a rising edge and a falling edge, as is shown in FIG. 12A. This is because the present invention is characterized by the enhancement of a rising portion of the speech signal. However, the present invention can be applied to a speech signal having arbitrary waveforms.

The input circuit 10 receives speech and then converts the received speech into an electric signal (i.e. speech signal). The speech signal is supplied to the rectifier 11, the level detector 31 and the average level detector 32.

The level detector 31 detects an instantaneous level of the speech signal, as is shown in FIG. 12E. The average level detector 32 detects an average level obtained by averaging the speech signal for a predetermined time period, as is shown FIG. 12F. The instantaneous level detected by the level detector 31 and the average level detected by the average level detector 32 are supplied to the comparator 33.

The comparator 33 calculates the difference between the instantaneous level detected by the level detector 31 and the average level detected by the average level detector 32, and then compares the calculated difference with a predetermined threshold value. When the calculated difference is greater than or equal to the predetermined threshold value, the comparator 33 outputs a value smaller than 1 (one) to the third time constant circuit 34. For example, the value smaller than 1 (one) may be 0.3. However, the value smaller than 1 (one) is not limited to a fixed value. The value smaller than 1 (one) may change depending on the amplitude of the impulsive sound. When the calculated, difference is smaller than the predetermined threshold value, the comparator 33 outputs a value of 1 (one) to the third time constant circuit 34. The output of the comparator 33 is shown in FIG. 12G. The output of the comparator 33 is used as a coefficient in the multiplier 15, which described later.

The third time constant circuit 34 applies a third time constant to the coefficient output from the comparator 33. The third time constant includes an attack time $T_{a3}$ corresponding to a rising portion of the speech signal and a release time $T_{r3}$ corresponding to a falling portion of the speech signal. The attack time $T_{a3}$ and the release time $T_{r3}$ satisfy the relationship of $T_{a3} \leqq T_{r3}$ in order for the coefficient to come back to 1 (one) smoothly. This is useful to avoid the occurrence of noises. The attack time $T_{a3}$ may be 0 msec. The output of the third time constant circuit 34 is shown in FIG. 12H.

The control circuit 40 receives the coefficient from the divider 14 and the coefficient from the third time constant circuit 34. When the coefficient from the third time constant circuit 34 is smaller than 1 (one), the control circuit 40 outputs the coefficient from the third time constant circuit 34 to the multiplier 15. When the coefficient from the third time constant circuit 34 is equal to 1 (one), the control circuit 40 outputs the coefficient from the divider 14 to the multiplier 15. The output of the control circuit 40 is shown in FIG. 12I.

The multiplier 15 receives the speech signal from the input circuit 10 and the coefficient from the control circuit 40, and multiplies the speech signal by the coefficient. The output of the multiplier 15 is shown in FIG. 12J. The output of the multiplier 15 converted into speech by the output circuit 16. Thus, speech having an enhanced rising portion is obtained with a restrained impulsive sound.

Thus, according to the speech enhancement apparatus having the configuration mentioned above, the rising portion of the speech is enhanced based on the difference between the time constants. In addition, an impulsive sound is restrained by controlling the coefficient to the speech signal by control circuit 40. As a result, clear and natural speech can be obtained with a restrained impulsive sound.

EXAMPLE 6

Figure 13:
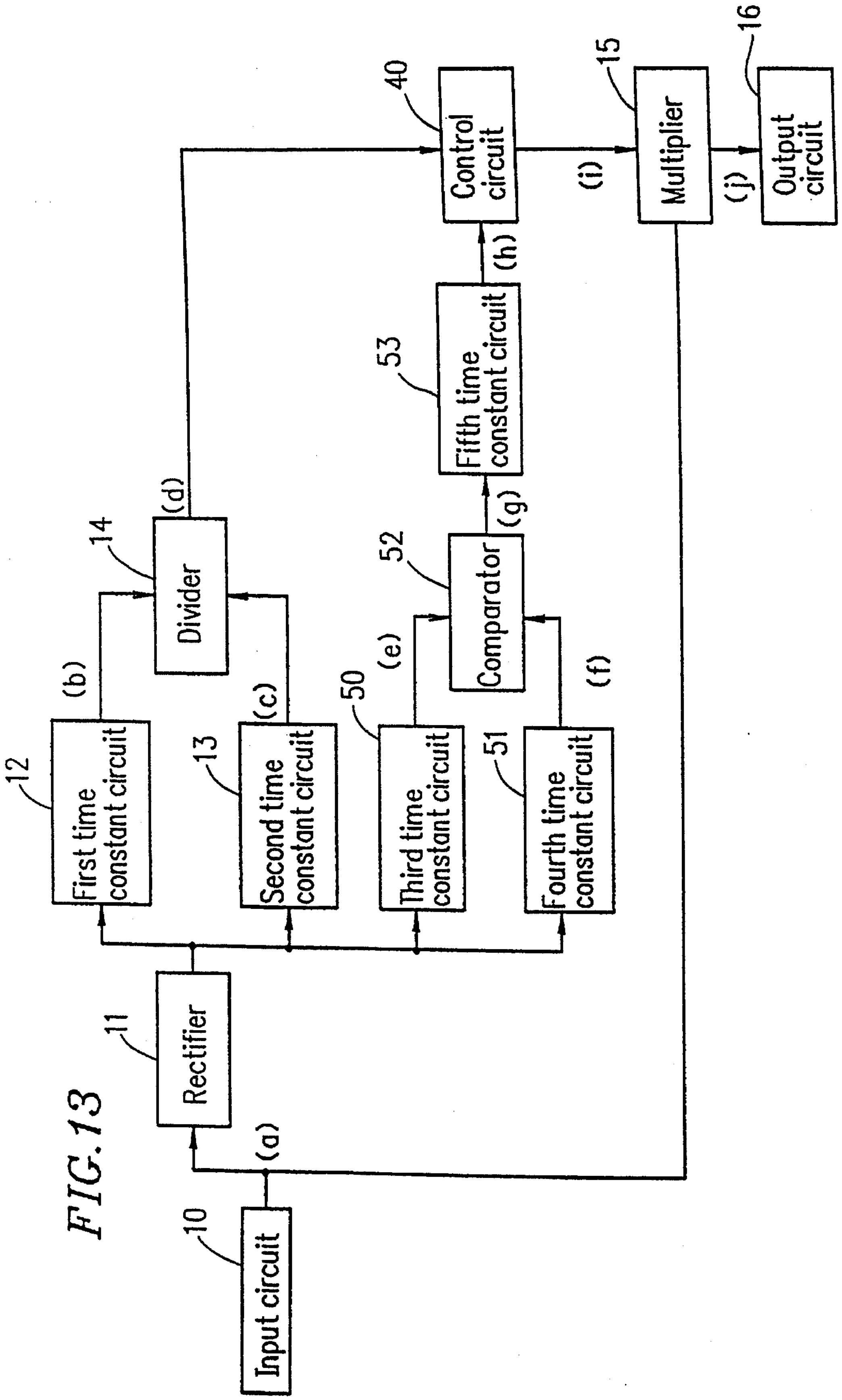
FIG. 13 is a block diagram of a sixth example of the speech enhancement apparatus according to the present invention.

FIG. 13 shows the configuration of a sixth example of the speech enhancement apparatus according to the present invention. The sixth example is different from the first example in that a circuit for restraining an impulsive sound is added. The circuit includes a third time constant circuit 50 for applying a third time constant to the output of the rectifier 11, a fourth time constant circuit 51 for applying a fourth time constant to the output of the rectifier 11, a comparator 52 for comparing the difference between the output of the third time constant circuit 50 and the output of the fourth time constant circuit 51 with a predetermined threshold value so as to output the comparison result, a fifth time constant circuit 53 for applying a fifth time constant to the output of the comparator 52, and a control circuit 40 for controlling to select one of the output of divider 14 and the output of the fifth time constant circuit 53 depending on the output of the fifth time constant circuit 53. In FIG. 13, the same components as the first example have the same reference numerals, and the explanation thereof will be omitted.

Next, referring to FIGS. 14A to 14J, the operation of the speech enhancement apparatus of this example will be described.

Figures 14A, 14B, 14C, 14D, 14E, 14F, 14G, 14H, 14I, 14J:
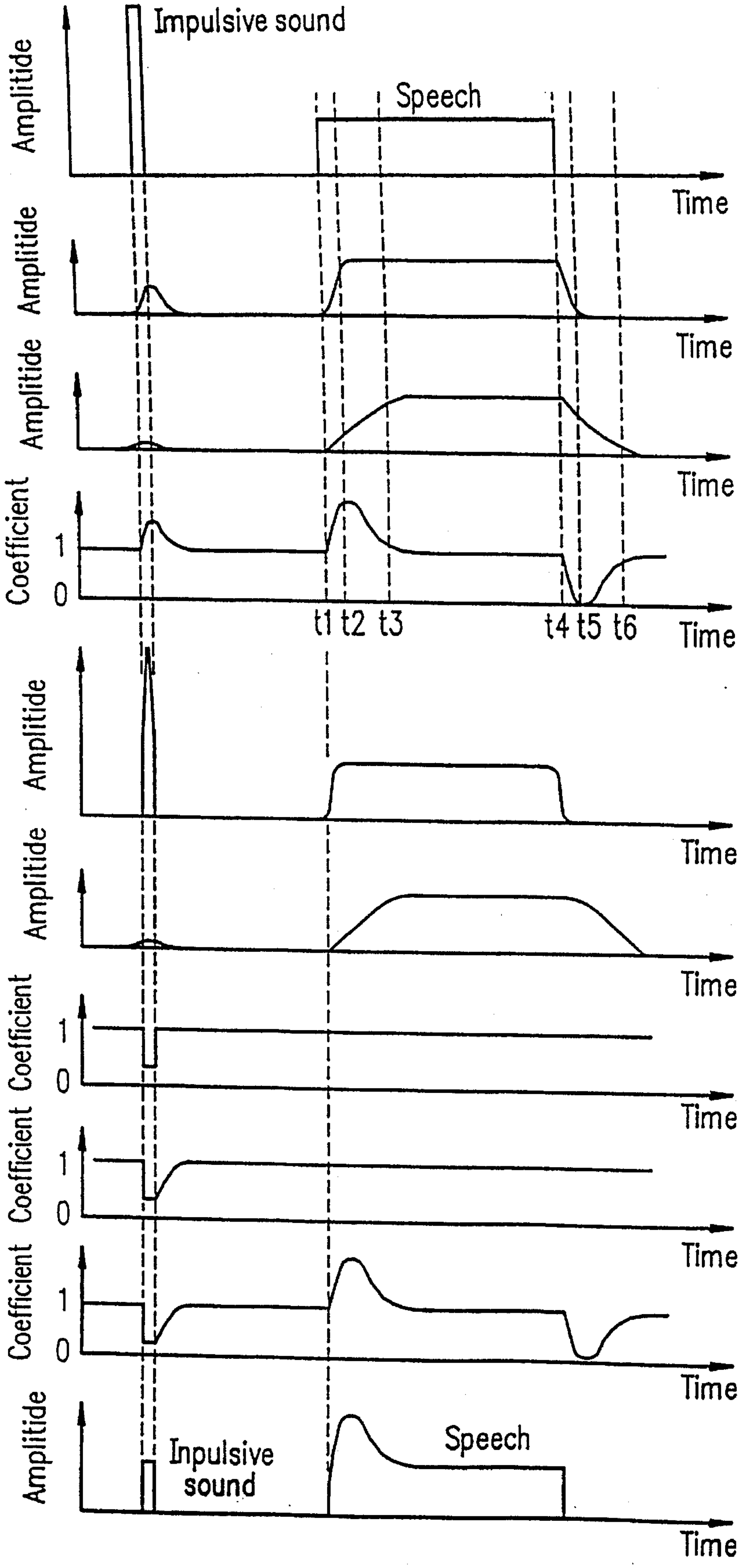
FIG. 14 is diagrams showing waveforms of a speech signal at different stages in the process by the sixth example of the speech enhancement apparatus according to the present invention.
Figure 15:
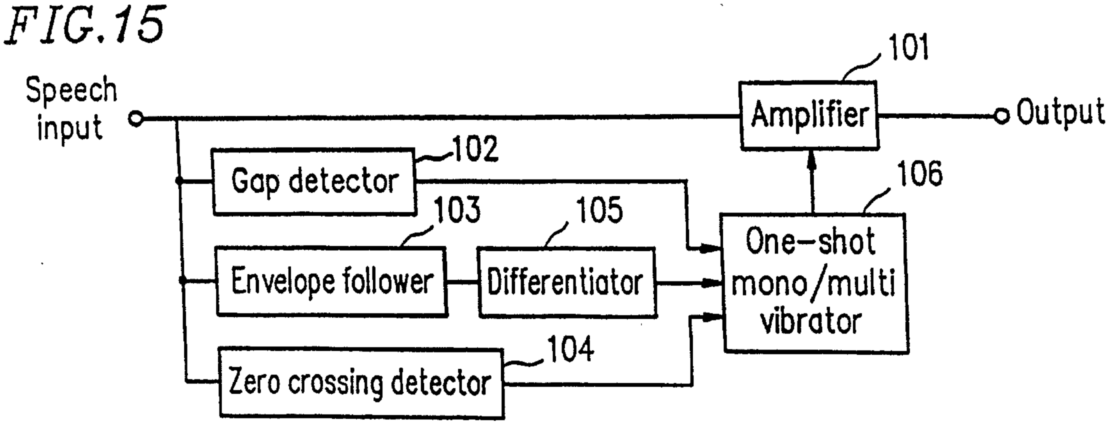
FIG. 15 is a block diagram of a conventional speech enhancement apparatus.
Figures 16A, 16B, 16C:
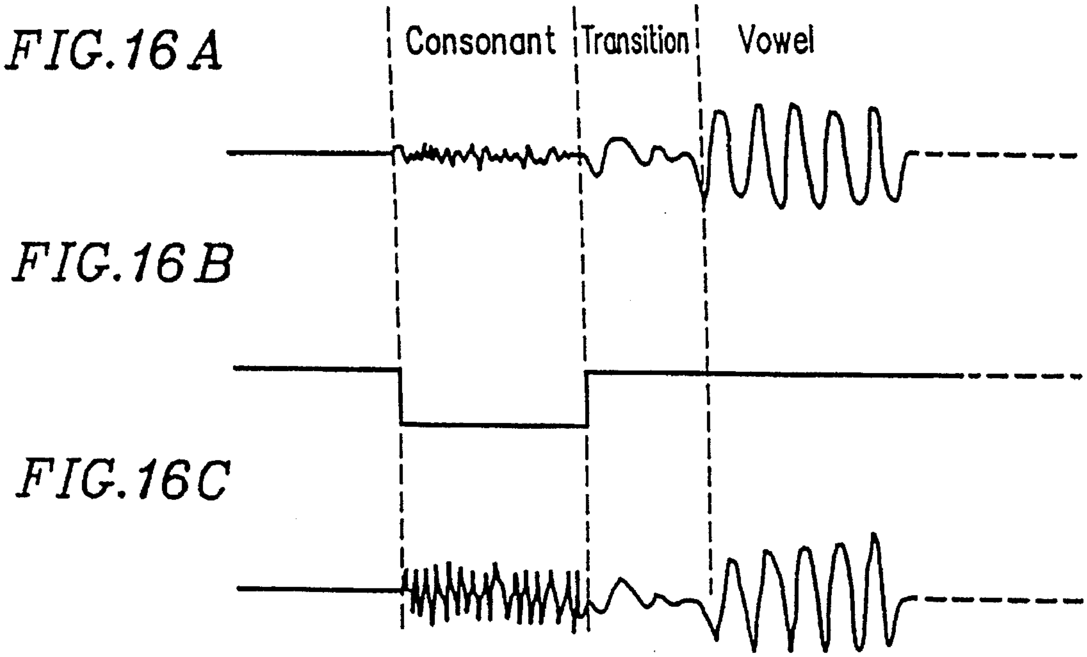
FIG. 16 is diagrams showing waveforms of a speech signal at different stages in the process by the conventional speech enhancement apparatus.

FIGS. 14A to 14J show waveforms of the speech signal at points (a) to (j) shown in FIG. 13. For simplicity of the explanation, it is assumed that the impulsive sound and the speech signal at point (a) have a rectangular-shaped waveform having a rising edge and a falling edge, as is shown in FIG. 14A. This is because the present invention is characterized by the enhancement of a rising portion of the speech signal. However, the present invention can be applied to a speech signal having arbitrary waveforms.

The input circuit 10 receives a speech, and then converts the received speech into an electric signal (i.e. speech signal). The speech signal is supplied to the rectifier 11. The rectifier 11 performs a full-wave rectification of the speech signal so as to output the resultant speech signal to the first, second, third and fourth time constant circuits 12, 13, 50 and 51.

The third time constant circuit 50 applies a third time constant to the output of the rectifier 11. The third time constant includes an attack time $T_{a3}$ corresponding to a rising portion of the speech signal and a release time $T_{r3}$ corresponding to a falling portion of the speech signal. The output of the third time constant circuit 50 is shown in FIG. 14E.

The fourth time constant circuit 51 applies a fourth time constant to the output of the rectifier 11. The fourth time constant includes an attack time $T_{a4}$ corresponding to a rising portion of the speech signal and a release time $T_{r4}$ corresponding to a falling portion of the speech signal. The output of the fourth time constant circuit 51 is shown in FIG. 14F.

The attack times $T_{a3}$ and $T_{a4}$ and the release times $T_{r3}$ and $T_{r4}$ satisfy the relationship of $T_{a3}<T_{a4}$ and $T_{r3}<T_{r4}$.

The comparator 52 calculates the difference between the output of the third time constant circuit 50 and the output of the fourth time constant circuit 51, and then compares the calculated difference with a predetermined threshold value. When the calculated difference is greater than or equal to the predetermined threshold value, the comparator 52 outputs a value smaller than 1 (one) to the fifth time constant circuit 53. For example, the value smaller than 1 (one) may be 0.3. However, the value smaller than 1 (one) is not limited to a fixed value. The value smaller than 1 (one) may change depending on the amplitude of the impulsive sound. When the calculated difference is smaller than the predetermined threshold value, the comparator 52 outputs a value of 1 (one) to the fifth tame constant circuit 53. The output of the comparator 52 is shown in FIG. 14G. The output of the comparator 52 is used as a coefficient in the multiplier 15, which described later.

The fifth time constant circuit 53 applies a fifth time constant to the coefficient output from the comparator 52. The fifth time constant includes an attack time $T_{a5}$ corresponding to a rising portion of the speech signal and a release time $T_{r5}$ corresponding to a falling portion of the speech signal. The attack time $T_{a5}$ and the release time $T_{r5}$ satisfy the relationship of $T_{a5} \leqq T_{r5}$ in order for the coefficient to come back to 1 smoothly. This is useful to avoid the occurrence of noises. The attack time $T_{a5}$ may be 0 msec. The output of the fifth time constant circuit 53 is shown An FIG. 14H.

The control circuit 40 receives the coefficient from the divider 14 and the coefficient from the fifth time constant circuit 53. When the coefficient from the fifth time constant circuit 53 is smaller than 1 (one), the control circuit 40 outputs the coefficient from the fifth time constant circuit 53 to the multiplier 15. When the coefficient from the fifth time constant circuit 53 is equal to 1 (one), the control circuit 40 outputs the coefficient from the divider 14 to the multiplier 15. The output of the control circuit 40 is shown in FIG. 14I.

The multiplier 15 receives the speech signal from the input circuit 10 and the coefficient from the control circuit 40, and multiplies the speech signal by the coefficient. The output of the multiplier 15 is shown in FIG. 14J. The output of the multiplier 15 is converted into a speech by the output circuit 16. Thus, speech having an enhanced rising portion is obtained with a restrained impulsive sound.

Thus, according to the speech enhancement apparatus having the configuration mentioned above, the rising portion of the speech is enhanced based on the difference between the time constants. In addition, an impulsive sound is restrained by controlling the coefficient to the speech signal by control circuit 40. As a result, clear and natural speech can be obtained with a restrained impulsive sound.

In examples 1 to 6, the rectifier 11 performs a full-wave rectification. However, the rectifier 11 may perform a half-wave rectification.

In examples 1 to 6, the release time $T_{r1}$ may be the same as the release time $T_{r2}$. In this case, the output of the divider 14 can become 1 (one) in the time corresponding to the falling portion of the speech after the attack time.

In example 5, when the calculated difference is greater than or equal to the predetermined threshold value, the comparator 33 outputs a value smaller than 1 (one) such as 0.3 to the third time constant circuit 34. However, the comparator may output arbitrary value which is greater than or equal to zero and is smaller than 1 (one) instead of the value smaller than 1 (one).

In example 6, when the calculated difference is greater than or equal to the predetermined threshold value, the comparator 52 outputs a value smaller than 1 (one) such as 0.3 to the fifth time constant circuit 53. However, the comparator may output arbitrary value which is greater than or equal to zero and is smaller than 1 (one) instead of the value smaller than 1 (one).

In example 5, the level detector 31 detects an instantaneous level of the speech signal, and the average level detector 32 detects an average level obtained by averaging the speech signal for a predetermined time period. However, the level detector 31 may detect an average amplitude or an average energy for a short period and the average level detector 32 may detect an average amplitude or an average energy for a long period.

Various other modifications will be apparent to and can be readily made by those skilled in the art without departing from the scope and spirit of this invention. Accordingly, it is not intended that the scope of the claims appended hereto be limited to the description as set fourth herein, but rather that the claims be broadly construed.

What is claimed is:

1. An apparatus for enhancing speech, comprising:

input means for receiving speech and for converting said speech into a speech signal;

rectifying means coupled to said input means for rectifying said speech signal;

first time constant means coupled to said rectifying means for applying a first time constant to the output of said rectifying means;

second time constant means coupled to said rectifying means for applying a second time constant to the output of said rectifying means, said second time constant being different from said first time constant;

dividing means coupled to said first time constant means and said second time constant means for obtaining a ratio of the output of said first time constant means to the output of said second time constant means;

multiplying means coupled to said input means and said dividing means for multiplying said speech signal by said ratio obtained by said dividing means; and output means coupled to said multiplying means for converting the output of said multiplying means into speech.

2. An apparatus according to claim 1, wherein said first time constant is smaller than said second time constant.

3. An apparatus according to claim 1, wherein said dividing means outputs a signal of 1 to said multiplying means when the output of said second time constant means is zero.

4. An apparatus according to claim 1, further comprising:

third time constant means coupled to said dividing means for applying a third time constant to the output of said dividing means, and wherein said multiplying means multiplies said speech signal by the output of said third time constant means.

5. An apparatus according to claim 1, further comprising:

limiting means coupled to said dividing means for limiting the output of said dividing means within a predetermined range defined by at least one of a lower limit and an upper limit, and wherein said multiplying means multiplies said speech signal by the output of said limiting means.

6. An apparatus according to claim 5, wherein said lower limit of said limiting means is 1.

7. An apparatus according to claim 1, further comprising:

third time constant means coupled to said dividing means for applying a third time constant to the output of said dividing means, and limiting means coupled to said third time constant means for limiting the output of said third time constant means within a predetermined range defined by at least one of a lower limit and an upper limit, and wherein said multiplying means multiplies said speech signal by the output of said limiting means.

8. An apparatus according to claim 7, wherein said lower limit of said limiting means is 1.

9. An apparatus for enhancing speech, comprising:

input means for receiving speech and for converting said speech into a speech signal;

rectifying means coupled to said input means for rectifying said speech signal;

first time constant means coupled to said rectifying means for applying a first time constant to the output of said rectifying means;

second time constant means coupled to said rectifying means for applying a second time constant to the output of said rectifying means, said second time constant being different from said first time constant;

dividing means coupled to said first time constant means and said second time constant means for obtaining a ratio of the output of said first time constant means to the output of said second time constant means;

level detecting means coupled to said input means for detecting an instantaneous level of said speech signal;

average level detecting means coupled to said input means for detecting an average level obtained by averaging said speech signal for a predetermined period of time;

comparing means coupled to said level detecting means and said average level detecting means for obtaining the difference between said instantaneous level detected by said level detecting means and said average level detected by said average level detecting means, and for outputting a coefficient signal based on the comparison result of said difference and a predetermined threshold value;

third time constant means coupled to said comparing means for applying a third time constant to said coefficient signal output from said comparing means;

control means coupled to said dividing means and said third time constant means for selectively outputting one of the output of said dividing means and the output of said third time constant means based on the output of said third time constant means;

multiplying means coupled to said input means and said control means for multiplying said speech signal by the output of said control means; and output means coupled to said multiplying means for converting the output of said multiplying means into speech.

10. An apparatus according to claim 9, wherein said first time constant is smaller than said second time constant.

11. An apparatus according to claim 9, wherein said dividing means outputs a signal of 1 to said multiplying means when the output of said second time constant means is zero.

12. An apparatus for enhancing speech, comprising:

input means for receiving speech and for converting said speech into a speech signal;

rectifying means coupled to said input means for rectifying said speech signal;

first time constant means coupled to said rectifying means for applying a first time constant to the output of said rectifying means;

second time constant means coupled to said rectifying means for applying a second time constant to the output of said rectifying means, said second time constant being different from said first time constant;

dividing means coupled to said first time constant means and said second time constant means for obtaining a ratio of the output of said first time constant means to the output of said second time constant means;

third time constant means coupled to said rectifying means for applying a third time constant to the output of said rectifying means;

fourth time constant means coupled to said rectifying means for applying a fourth time constant to the output of said rectifying means, said fourth time constant being different from said third time constant;

comparing means coupled to said third time constant means and said fourth time constant means for obtaining the difference between the output of said third time constant means and the output of said fourth time constant means, and for outputting a coefficient signal based on the comparison result of said difference and a predetermined threshold value;

fifth time constant means coupled to said comparing means for applying a fifth time constant to said coefficient signal output from said comparing means;

control means coupled to said dividing means and said fifth time constant means for selectively outputting one of the output of said dividing means and the output of said fifth time constant means based on the output of said fifth time constant means;

multiplying means coupled to said input means and said control means for multiplying said speech signal by the output of said control means; and output means coupled to said multiplying means for converting the output of said multiplying means into speech.

13. An apparatus according to claim 12, wherein said first time constant is smaller than said second time constant.

14. An apparatus according to claim 12, wherein said dividing means outputs a signal of 1 to said multiplying means when the output of said second time constant means is zero.

* * * * *